United States Patent
Singhai et al.

(10) Patent No.: US 8,634,310 B2
(45) Date of Patent: Jan. 21, 2014

(54) METHODS AND APPARATUS FOR IMPROVED PROGRAM ACQUISITION FOR USE WITH MPEG-2 BASED SYSTEMS

(75) Inventors: Sandeep Singhai, San Diego, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 12/144,550

(22) Filed: Jun. 23, 2008

(65) Prior Publication Data

US 2009/0019499 A1 Jan. 15, 2009

Related U.S. Application Data

(60) Provisional application No. 60/946,342, filed on Jun. 26, 2007.

(51) Int. Cl.
- *G01R 31/08* (2006.01)
- *G06F 11/00* (2006.01)
- *G08C 15/00* (2006.01)
- *H04J 1/16* (2006.01)
- *H04J 3/14* (2006.01)
- *H04L 1/00* (2006.01)
- *H04L 12/26* (2006.01)

(52) U.S. Cl.
USPC ...... 370/252; 370/395.64; 370/476; 370/522; 370/527; 711/113; 711/118

(58) Field of Classification Search
USPC ............ 370/252, 395.64, 476, 522, 527; 348/571; 345/557; 711/113, 118–146
See application file for complete search history.

(56) References Cited

U.S. PATENT DOCUMENTS 6,016,172 A * 1/2000 Huh .................. 375/240.27
6,229,801 B1 * 5/2001 Anderson et al. ............ 370/349
(Continued)

FOREIGN PATENT DOCUMENTS

CN 1221285 A 6/1999
CN 1691762 A 11/2005
(Continued)

OTHER PUBLICATIONS

International Search Report, PCT/US2008/068415—International Search Authority—European Patent Office—Oct. 30, 2008.

(Continued)

*Primary Examiner* — Benjamin H Elliott, IV
(74) *Attorney, Agent, or Firm* — Fulbright & Jaworski LLP (57) ABSTRACT

Methods and apparatus for improved program acquisition for use with MPEG-2 based systems. In an aspect, a method includes receiving a program association table (PAT) associated with an MPEG-2 transport stream, and identifying program map tables (PMTs) included in the PAT. The method also includes caching the PMTs, receiving a request to present a program, determining if a PMT associated with the program has been cached, and acquiring the selected program using information from the cached PMT. An apparatus includes means for receiving a PAT associated with an MPEG-2 transport stream and means for identifying PMTs included in the PAT. The apparatus also includes means for caching the PMTs, means for receiving a request to present a program, means for determining if a PMT associated with the program has been cached, and means for acquiring the selected program using information from the cached PMT.

45 Claims, 5 Drawing Sheets

(56) References Cited

U.S. PATENT DOCUMENTS

| | | | |
|---|---|---|---|
| 6,480,537 B1 * | 11/2002 | Agrawal et al. | 375/240 |
| 6,598,233 B1 | 7/2003 | Choi | |
| 6,754,392 B2 | 6/2004 | Taunton | |
| 6,985,188 B1 * | 1/2006 | Hurst, Jr. | 348/553 |
| 7,184,652 B2 * | 2/2007 | Sugimoto et al. | 386/98 |
| 7,400,652 B2 * | 7/2008 | Kim et al. | 370/486 |
| 7,555,019 B2 | 6/2009 | Motomura | |
| 2003/0101448 A1 * | 5/2003 | Kim | 725/9 |
| 2003/0194139 A1 * | 10/2003 | Taunton | 382/236 |
| 2005/0008039 A1 * | 1/2005 | Funaya et al. | 370/474 |
| 2005/0034123 A1 * | 2/2005 | Shiomi et al. | 718/1 |
| 2005/0091697 A1 * | 4/2005 | Tanaka et al. | 725/131 |
| 2005/0105537 A1 * | 5/2005 | Motomura | 370/395.64 |
| 2005/0163163 A1 * | 7/2005 | Kim et al. | 370/486 |
| 2005/0172314 A1 * | 8/2005 | Krakora et al. | 725/38 |
| 2007/0220557 A1 * | 9/2007 | Lee et al. | 725/54 |
| 2007/0245395 A1 * | 10/2007 | Masuda | 725/131 |
| 2008/0037658 A1 * | 2/2008 | Price et al. | 375/240.26 |
| 2008/0062990 A1 * | 3/2008 | Oran | 370/392 |
| 2008/0120671 A1 * | 5/2008 | Sim et al. | 725/116 |
| 2009/0019499 A1 * | 1/2009 | Singhai et al. | 725/92 |
| 2009/0046855 A1 * | 2/2009 | Grimes et al. | 380/200 |

FOREIGN PATENT DOCUMENTS

| | | |
|---|---|---|
| EP | 0921681 | 6/1999 |
| EP | 1107601 | 6/2001 |
| EP | 0921681 | 4/2004 |
| EP | 1475969 | 11/2004 |
| JP | 10271464 A | 10/1998 |
| JP | 11234633 A | 8/1999 |
| JP | 2004312629 A | 11/2004 |
| KR | 20010060382 A | 7/2001 |
| KR | 20050076894 | 7/2005 |
| KR | 20080007511 A | 1/2008 |
| WO | 0057646 | 9/2000 |
| WO | WO0119002 A1 | 3/2001 |
| WO | 2006121801 | 11/2006 |
| WO | 2008057080 | 5/2008 |

OTHER PUBLICATIONS

Written Opinion, PCT/US2008/068415—International Search Authority—European Patent Office—Oct. 30, 2008.

International Preliminary Report on Patentability, PCT/US2008/068415, International Preliminary Examining Authority, European Patent Office, Oct. 22, 2009.

* cited by examiner

METHODS AND APPARATUS FOR IMPROVED PROGRAM ACQUISITION FOR USE WITH MPEG-2 BASED SYSTEMS

CLAIM OF PRIORITY UNDER 35 U.S.C. §119

The present Application for Patent claims priority to Provisional Application No. 60/946,342 entitled "Methods and Apparatus to Reduce Channel Launch and Channel Switching Latencies in a Resource Limited Broadcast Receiver" filed Jun. 26, 2007, and assigned to the assignee hereof and hereby expressly incorporated by reference herein.

BACKGROUND

1. Field

The present application relates generally to the operation of broadcast systems, and more particularly, to methods and apparatus for improved program acquisition for use with MPEG-2 based systems.

2. Background

In a typical broadcast network, content is transmitted to wireless devices in a transport stream. For example, the transport stream may be an MPEG-2 based transport stream. The transport stream utilizes a unique integer value referred to as a packet identifier (PID) to identify elementary streams of transmitted programs.

With regards to MPEG-2 based systems, Program Specific Information (PSI) is utilized that comprises a Program Association Table (PAT) and Program Map Table (PMT). The PAT provides correspondence between program numbers and PID values associated with the corresponding PMTs in the transport stream. The program number is the numeric label associated with a program. The Program Map Table provides the mappings between program numbers and PIDs that identify the program elements that comprise each program. A single instance of such a mapping is referred to as a "program definition". The PMT is the complete collection of all program definitions for a transport stream. The PAT and PMT are transmitted with a certain periodicity, typically every 100 ms or less. A receiving device needs to capture these tables before program playback in order to identify and locate the program elements that are part of a desired program.

In general, mobile receivers that are capable of receiving MPEG2 transport streams are resource limited. For example, more and more mobile receivers currently available have been designed to receive digital television broadcasts (e.g., DVB-H). However, one common limitation of such receivers is the number of PIDs that can be filtered or processed simultaneously. Due to this limitation, the conventional approach is to start filtering a PMT PID only when the corresponding program needs to be presented (i.e., playback). This introduces time latencies when launching a program or switching between programs since the appropriate PID has to be determined and the associated program components acquired.

Therefore, it is desirable to have a program acquisition mechanism that operates to allow a device to launch and switch between programs in an MPEG-2 transport stream in an efficient manner while minimizing time latencies associated with conventional systems.

SUMMARY

In one or more aspects, a program acquisition system, comprising methods and apparatus, is provided that operates to allow a device to reduce program launch and switching latencies associated with MPEG-2 based systems. For example, the program acquisition system operates to cache selected PMT information so that time latencies can be reduced when launching or switching between programs.

In an aspect, a method is provided for program acquisition. The method comprises receiving a PAT associated with an MPEG-2 transport stream, and identifying one or more PMTs included in the PAT. The method also comprises caching the one or more PMTs, receiving a request to present a selected program, determining if a PMT associated with the selected program has been cached, and if the PMT associated with the selected program has been cached, then acquiring the selected program using information from the cached PMT.

In an aspect, an apparatus is provided for program acquisition. The apparatus comprises input logic configured to receive a PAT associated with an MPEG-2 transport stream. The apparatus also comprises program management logic configured to: identify one or more PMTs included in the PAT; cache the one or more PMTs; receive a request to present a selected program; determine if a PMT associated with the selected program has been cached; and acquire the selected program using information from the cached PMT, if the PMT associated with the selected program has been cached.

In an aspect, an apparatus is provided for program acquisition. The apparatus comprises means for receiving a PAT associated with an MPEG-2 transport stream and means for identifying one or more PMTs included in the PAT. The apparatus also comprises means for caching the one or more PMTs, means for receiving a request to present a selected program, means for determining if a PMT associated with the selected program has been cached, and means for acquiring the selected program using information from the cached PMT if the PMT associated with the selected program has been cached.

In an aspect, a computer program product is provided for program acquisition. The computer program product comprises a machine-readable medium that comprises a first set of codes for causing a computer to receive a PAT associated with an MPEG-2 transport stream, a second set of codes for causing the computer to identify one or more PMTs included in the PAT, and a third set of codes for causing the computer to cache the one or more PMTs. The machine-readable medium also comprises a fourth set of codes for causing the computer to receive a request to present a selected program, a fifth set of codes for causing the computer to determine if a PMT associated with the selected program has been cached, and a sixth set of codes for causing the computer to acquire the selected program using information from the cached PMT if the PMT associated with the selected program has been cached.

In an aspect, at least one integrated circuit is provided that is configured for program acquisition. The at least one integrated circuit comprises a first module configured to receive a PAT associated with an MPEG-2 transport stream, a second module configured to identify one or more PMTs included in the PAT, and a third module configured to cache the one or more PMTs. The at least one integrated circuit also comprises a fourth module configured to receive a request to present a selected program, a fifth module configured to determine if a PMT associated with the selected program has been cached, and a sixth module configured to acquire the selected program using information from the cached PMT if the PMT associated with the selected program has been cached.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

In one or more aspects, a program acquisition system, comprising methods and apparatus, is provided that operates to allow a device to reduce program launch and switching latencies associated with MPEG-2 based systems. In an aspect, the program acquisition system operates to cache selected PMT information so that time latencies can be reduced when launching or switching programs received in an MPEG-2 transport stream.

The program acquisition system described herein is well suited for use in MPEG-2 based broadcast systems but may be used in other types of MPEG-2 based systems as well.

Figure 1:
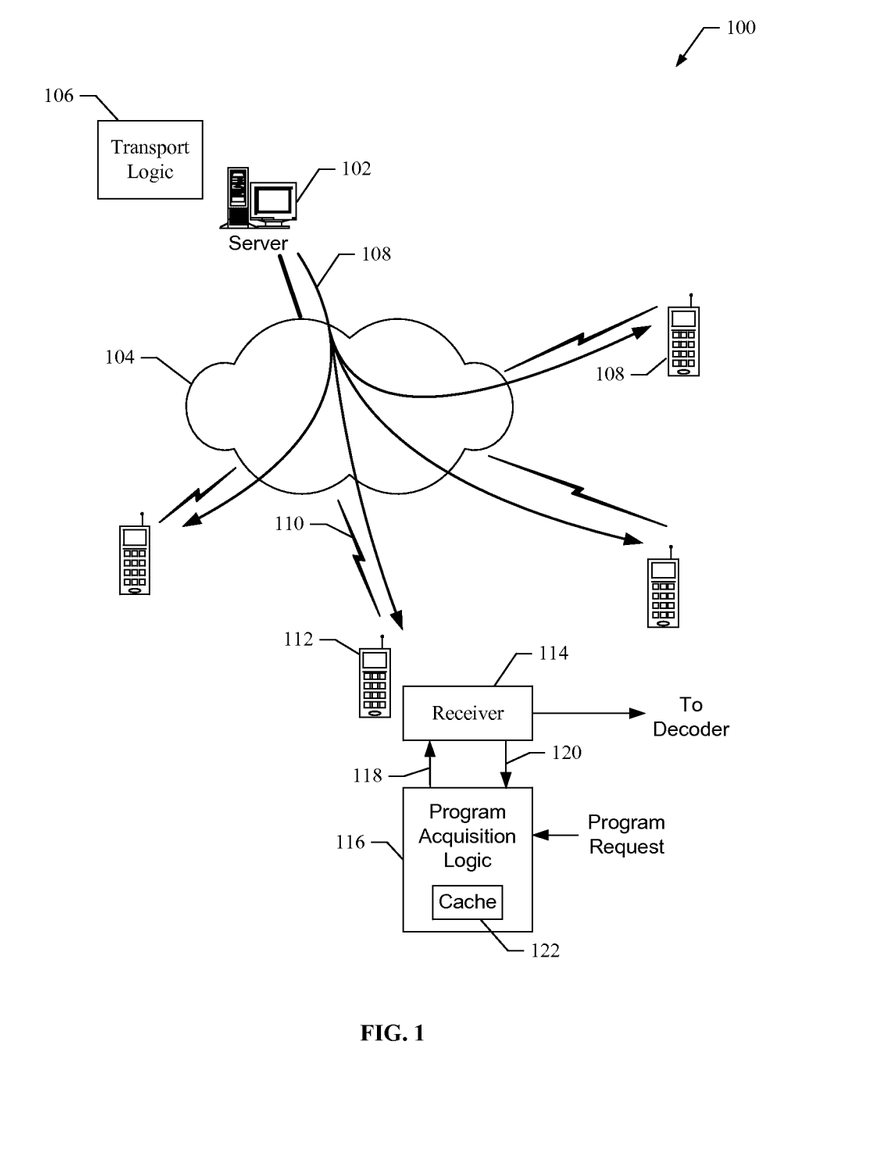
FIG. 1 shows a network that illustrates the operation of aspects of a program acquisition system.

FIG. 1 shows a network 100 that illustrates the operation of aspects of a program acquisition system. For example, the network 100 comprises a server 102 that operates to transmit content and/or services over a communication network 104 to one or more portable devices. The server 102 comprises transport logic 106 that operates to format content into MPEG-2 transport streams for transmission over the network 104. In this configuration, the components of the content are assigned MPEG-2 transport PIDs so that receiving devices can detect and receive selected program components which they desire to receive. For example, a transport stream 108 is transmitted from the server 102 over the network 104 to one or more portable devices.

The devices communicate with the network 104 through wireless links 110. For the purpose of this description, the device 112 will be described in greater detail. It should be noted that device 112 is representative and that aspects of the program acquisition system are suitable for use with any device capable of receiving MPEG-2 transport streams.

The device 112 comprises a receiver 114 that can be tuned to receive the transport stream 108. The receiver 114 demultiplexes selected content components of a particular program in the transport stream and provides these components to the device for consumption, e.g., for video decoding.

The device 112 comprises program acquisition logic 116. The program acquisition logic 116 operates to receive program requests and processes these request to generate a program selection message 118 to the receiver 114. The program selection message 118 causes the receiver to receive selected components of the transport stream and output these components to the device for consumption, e.g., for video decoding.

The program acquisition logic 116 operates to receive the transport stream from the receiver 114 as shown at 120. The program acquisition logic 116 operates to cache selected PMTs from the transport stream in a cache 122. For example, in an aspect, the number of PMTs that are cached is based on the amount of memory available at the device 112. However, any other criteria may be used to determine how may PMTs are cached by the program acquisition logic 116. In an aspect, the determination of which PMTs to cache is based on various criteria. For example, the program acquisition logic 116 may determine which PMTs to cache based on a user's viewing history, program order, most watched, priority, device operating region, any type of heuristic model, or any other suitable criteria, Furthermore, the program acquisition logic 116 provides program management functions to determine which PMTs are stored or removed from the cache 122. For example, the program acquisition logic 116 determines when to remove previously stored PMTs (i.e., inactive PMTs) from the cache.

When a program selection request is received, the program acquisition logic 116 operates to access the PMTs in the cache 122 to determine the correct PIDs to obtain the desired program components. This information is sent to the receiver 114 as part of a program selection message 118.

Thus, to provide for fast program launch and switching, the program acquisition logic 116 operates to perform one or more of the following functions.
1. Receive a PAT from an MPEG-2 transport stream.
2. Determine a selected number of PMTs to be cached
3. Determine which PMTs to be cached.
4. Caching the determined PMTs.
5. Receive a request for a program acquisition that may be a result of program launch or a program switch.
6. Access the cache to obtain the appropriate PMT and corresponding PIDs to complete the program acquisition.
7. Maintain the cache to remove inactive PMTs from the cache as necessary.

Therefore, in various aspects, the program acquisition system operates to cache selected PMT information so that time latencies can be reduced when launching or switching between programs of an MPEG-2 transport stream.

Figure 2:
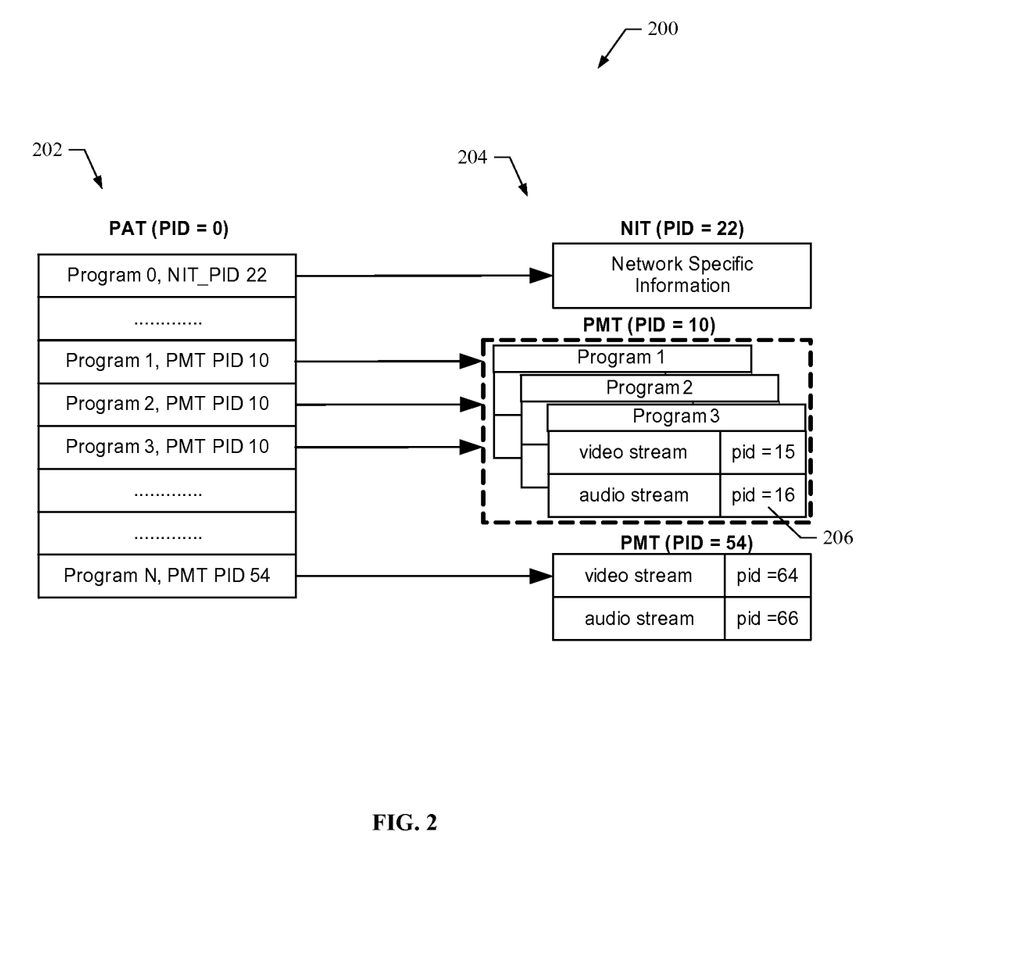
FIG. 2 shows program acquisition logic for use in aspects of a program acquisition system.

FIG. 2 shows a diagram that illustrates the relationship between a program association table 202 and program map tables 204 for use in aspects of a program acquisition system. As shown in the diagram, the program association table 202 has packet identifier "0" in the received transport stream. The program association table 202 provides a mapping between programs and program map table packet identifiers. For example, the entry for program 1 in the program association table 202 identifies a PMT with packet identifier 10.

The program association table 202 may include multiple entries for different programs having the same packet identifier. For example, the program association table 202 identifies programs 1, 2 and 3 in the program map table 204 having the same packet identifier 10. However, the program map table information for different programs on the same PID can be differentiated by examining the program number field 206 in PMT sections, as illustrated in FIG. 2.

In this description, the notation PMT(s,p) denotes a program map table corresponding to program "s" being transmitted on PID "p." In an aspect, the program acquisition system operates to pre-acquire as many program map tables as possible so that a program map table may be readily available when the corresponding program needs to be presented. By pre-acquiring program map tables, the program acquisition system operates to filter transport stream packets with selected PIDs even before any request is received to present a corresponding program. Thus, the system operates to reduce average channel launch and channel switch latencies which in turn, improves the user experience.

Figure 3:
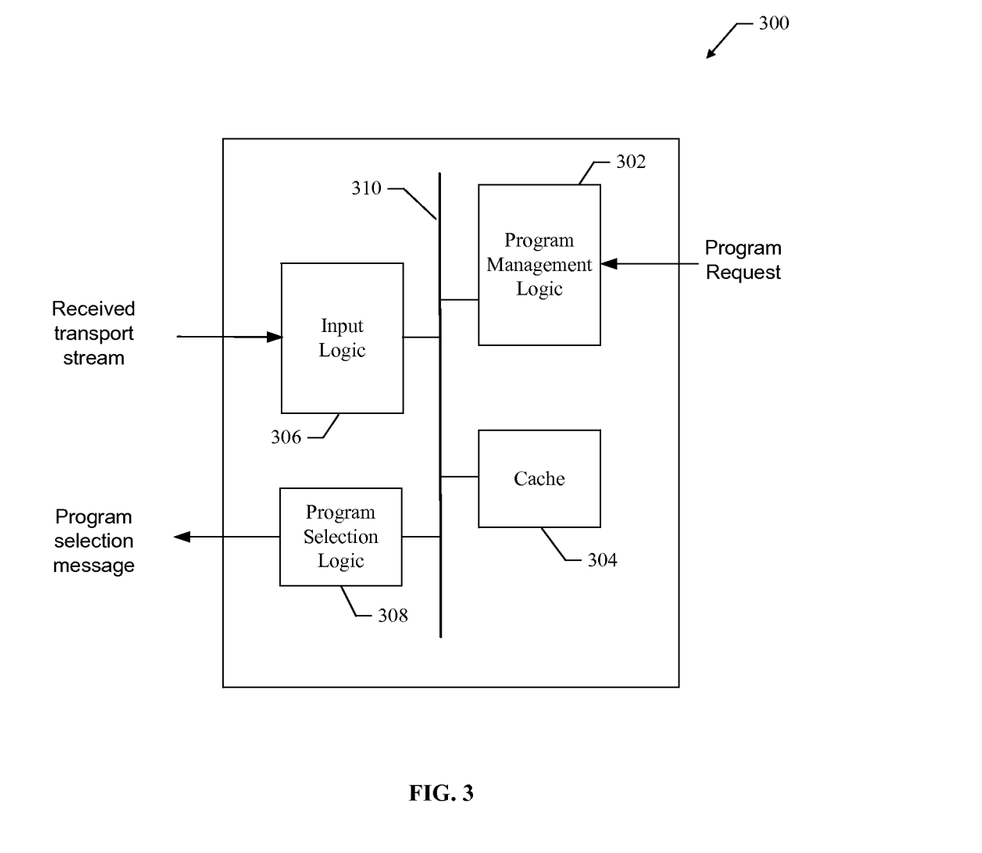
FIG. 3 shows exemplary tables for use in aspects of a program acquisition system.

FIG. 3 shows program acquisition logic 300 for use in aspects of a program acquisition system. For example, the program acquisition logic 300 is suitable for use as the program acquisition logic 116 shown in FIG. 1. The program acquisition logic 300 comprises program management logic 302, cache 304, input logic 306, and program selection logic 308 all coupled to a data bus 310.

The input logic 306 comprises at least one of a CPU, processor, gate array, hardware logic, memory elements, and/or hardware executing software. The input logic 306 operates to receive an MPEG-2 transport stream from receiver logic that is tuned to a selected RF channel. The input logic 306 passes the received transport stream to the processing logic 302.

The cache 304 comprises at least one of a CPU, processor, gate array, hardware logic, memory elements, and/or hardware executing software. In an aspect, the cache 304 operates to store program map table information that is obtained from a received MPEG-2 transport stream. In an aspect, the processing logic 302 operates to control the cache 304 to store selected program map table information The program management logic 302 comprises at least one of a CPU, processor, gate array, hardware logic, memory elements, and/or hardware executing software. In an aspect, the program management logic 302 operates to receive a program request that indicates a program from an MPEG-2 transport stream to be consumed by the device.

The program management logic 302 also operates to determine which and how many PMTs from a received transport stream are to be cached in the cache 304. For example, PMTs that are cached can be accessed by the program management logic 302 to reduce program launch and program switch time latencies. The program management logic 302 also controls which PMT information is added and/or removed from the cache 304. A more detailed description of the operation of the program management logic 302 is provided in another section of this document.

The program selection logic 308 comprises at least one of a CPU, processor, gate array, hardware logic, memory elements, and/or hardware executing software. The program selection logic 308 operates to generate a program selection message that identifies a selected program to be consumed by the device. The program selection message is sent to the device receiver, for example, the receiver 114 shown in FIG. 1. With this information, the receiver 114 can quickly acquire selected program components for consumption, e.g., for audio/video presentation to the user.

In an aspect, the program acquisition system comprises a computer program product having one or more program instructions ("instructions") or sets of "codes" stored or embodied on a machine-readable medium. When the codes are executed by at least one processor, for instance, a processor at the program management logic 302, their execution causes the processor to provide the functions described herein. For example, the sets of codes may be embodied on a machine-readable medium, such as a floppy disk, CDROM, memory card, FLASH memory device, RAM, ROM, or any other type of memory device or machine-readable medium that interfaces to the program acquisition logic 300. In another aspect, the sets of codes may be downloaded into the program acquisition logic 300 from an external device or network resource. The sets of codes, when executed, cause a processor to provide aspects of a program acquisition system as described herein.

Operation Overview

In an aspect, the program acquisition system operates to cache PMTs of an MPEG-2 transport stream to allow for fast program launch and program switching. Each PMT is associated with a state; active or inactive. A PMT in the active state corresponds to a program currently being presented. A PMT in the inactive state does not correspond to any program being currently presented.

If a received PAT contains (p+1) entries, the program acquisition system starts acquisition of "m" PMTs in the inactive state as soon as the PAT is acquired, such that these m PMTs correspond to "n" unique PIDs where m<=p and m>=n. Note that the $0^{th}$ entry in the PAT corresponds to the NIT and hence, it may not be considered for PMT pre-acquisition. In an aspect, the value of n is configurable and it depends on the number of PID's that can be filtered concurrently. In an aspect, the number of PMTs that are cached is based on the amount of memory available at the device 112. However, any other criteria may be used to determine how may PMTs are cached by the program acquisition logic 116. In an aspect, the determination of which PMTs to cache is based on various heuristics models. For example, the program acquisition logic 116 may determine which PMTs to cache based on a user's viewing history. However, any other criteria may be used to determine which PMTs to cache, such as similar program content, priority, device operating regions, time of day, or any other criteria.

When acquisition of a particular PMT (i.e., PMT(s1, p1)) is started, an associated PMT acquisition timer t(s1, p1) is also started. In an aspect, the program management logic 302 maintains timers utilized by the program acquisition system. When a request is received to present program s1 and the corresponding PMT is PMT(s1, p1) and p1 is currently being filtered, the state of PMT(s1, p1) is set to active. If PMT(s1, p1) is already acquired then it can be used right away to retrieve elementary stream information necessary for program presentation. Otherwise, PMT(s1, p1) will either eventually be acquired from the received transport stream or timer t(s1, p1) will expire.

When a request is received to present program s1 and the corresponding PMT is PMT(s1, p1) and p1 is currently not being filtered, the number of PMT PIDs being currently assembled is checked to see if it is less than n. One or more of the following operations are performed.

1. If the number of PMT PIDs is less than n, the acquisition of PMT(s1, p1) is started and its state is set to active. Filtering begins for PID p1.
2. If the number of PMT PIDs is not less than n, a check is performed to see if there is a PMT PID p3 being filtered such that all the PMTs corresponding to p3 are inactive. If yes, then the following operations are performed.
   a. All these inactive PMTs are removed from the cache.
   b. The PID filter for p3 is removed.
   c. Acquisition of PMT(s1, p1) is started and its state is set to active.

If no such inactive PMT PIDs are available then PMT(s1, p1) cannot be acquired and a failure to present program s1 is declared When timer t(s1, p1) expires for an inactive PMT, the PMT(s1, p1) is removed from the cache and it is determined if there is any PMT (active or inactive) in use with PID=p1. One or more of the following operations are performed.

1. If there is a PMT in use with PID=p1, then acquisition of a PMT(s3, p1) is started where s3 is different from s1 and is not currently being acquired.
2. If there is no PMT in use with PID=p1, then the PID filter for p1 is removed and acquisition of a PMT(s3, p3) is started in the inactive state, where s3 is different from s1 and s3 is currently not being acquired.

Figure 4:
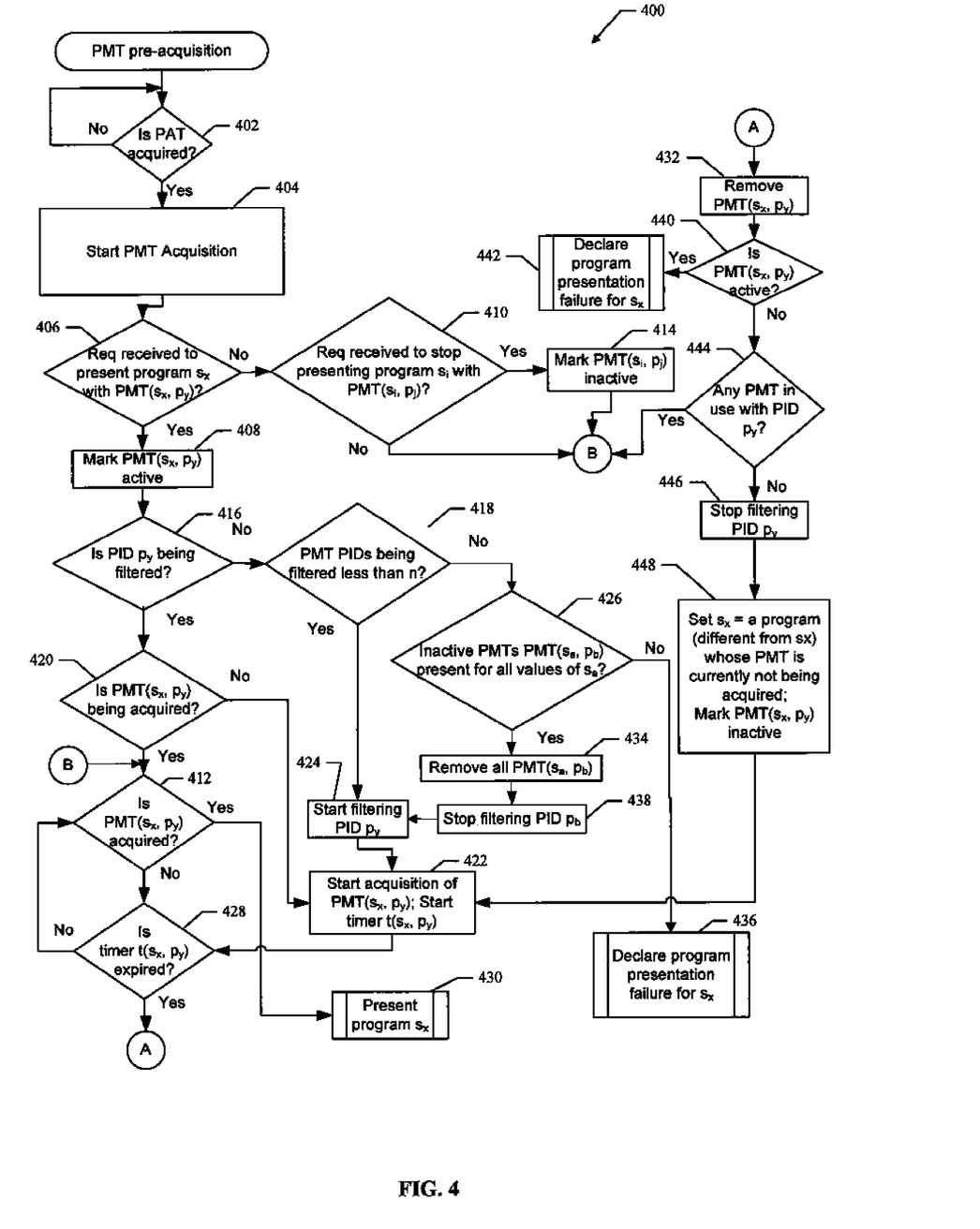
FIG. 4 shows a method for performing program acquisition for use in aspects of a program acquisition system.

When timer t(s1, p1) expires for an active PMT, a failure to present program p1 is declared. The remaining processing of timer expirations for active PMTs are the same as that of inactive PMTs FIG. 4 shows a method 400 for performing program acquisition for use in aspects of a program acquisition system. For clarity, the method 400 is described herein with reference to the program acquisition logic 300 shown in FIG. 3. For example, in an aspect, the program management logic 302 executes one or more sets of codes to control the program acquisition logic 300 to perform the functions described below.

At block 402, a determination is made as to whether a program association table has been acquired from a received MPEG-2 transport stream. If a PAT has not been acquired, the method remains at block 402. If a PAT has been acquired, the method proceeds to block 404.

At block 404, PMT acquisition is started wherein selected PMTs are cached. For example, the program management logic 302 operates to control the input logic 306 and the cache 304 to cache selected PMTs from the received transport stream to be cached. In an aspect, the following operations are performed.
1. Start acquisition of $PMT(s_i, p_j)$ in inactive state;
2. Start filtering PID $p_j$; and
3. Start timer $t(s_i, p_j)$;
where $0 \leq i \leq q$; $0 \leq j \leq n$; and (q+1) is the number of entries in program association table acquired at block 402. In an aspect, there is a many to one mapping from $s_i$ to $p_j$ as determined from the program association table, where n is a configurable number.

In an aspect, the number of PMTs that are cached is based on the amount of memory available at the receiving device. However, any other criteria may be used to determine how may PMTs are cached. In an aspect, the determination of which PMTs to cache is based on various criteria. For example, the program management logic 302 may determine which PMTs to cache based on viewing history, heuristic models, or any other criteria, At block 406, a determination is made as to whether a request has been received to present program "$s_x$" with PMT $(s_x, p_y)$. For example, the program management logic 302 receives the program request. If a request has been received the method proceeds to block 408. If a request has not been received, the method proceeds to block 410.

At block 410, a determination is made as to whether a request has been received to stop presenting program $s_1$ with $PMT(s_i, p_j)$. If a request has not been received, the method follows on-page connector B to block 412. If a request has been received, the method proceeds to block 414.

At block 414, the $PMT(s_i, p_j)$ is marked as inactive. For example, in an aspect, the program management logic 302 operates to mark the $PMT(s_i, p_j)$ as inactive. The method then follows on-page connector B to block 412.

At block 408, $PMT(s_x, p_y)$ is marked as active. For example, in an aspect, the program management logic 302 operates to mark the $PMT(s_x, p_y)$ as active.

At block 416, a determination is made as to whether PID $p_y$ is currently being filtered. If PID $p_y$ is not being filtered, the method proceeds to block 418. If PID $p_y$ is being filtered, the method proceeds to block 420.

At block 420, a determination is made as to whether PMT $(s_x, p_y)$ is currently being acquired. If $PMT(s_x, p_y)$ is currently being acquired, the method proceeds to block 412. If $PMT(s_x, p_y)$ is not currently being acquired, the method proceeds to block 422.

At block 418, a determination is made as to whether the number of PMT PIDs being filtered is less than n. If the number of PMT PIDs being filtered is less than n, the method proceeds to block 424. If the number of PMT PIDs being filtered is not less than n, the method proceeds to block 426.

At block 424, PID $p_y$ is filtered.

At block 422, the acquisition of $PMT(s_x, p_y)$ is started as is the timer t(sx, $p_y$). In an aspect, the program management logic 302 maintains timer t(sx, $p_y$). The method then proceeds to block 428.

At block 412, a determination is made as to whether PMT $(s_x, p_y)$ has been acquired. If $PMT(s_x, p_y)$ has been acquired, the method proceeds to block 430. If $PMT(s_x, p_y)$ has not been acquired, the method proceeds to block 428.

At block 430, the program $s_x$ is presented.

At block 428, a determination is made as to whether timer $t(s_x, py)$ has expired. If timer $t(s_x, p_y)$ has not expired, the method proceeds to block 412. If timer $t(s_x, py)$ has expired, the method follows on-page connector A to block 432.

At block 426, a determination is made as to whether inactive PMTs, (i.e., $PMT(s_a, p_b)$) are present for all values of $s_a$. If inactive PMTs are present, the method proceeds to block 434. If inactive PMTs are not present, the method proceeds to block 436.

At block 436, a program presentation failure is declared for program $s_x$.

At block 434, all $PMT(s_a, p_b)$ are removed from the cache.

At block 438, the filtering of PID $p_b$ is stopped.

At block 432, $PMT(s_x, p_y)$ is removed from the cache.

At block 440, a determination is made as to whether PMT $(s_x, p_y)$ is active. If $PMT(s_x, p_y)$ is active, the method proceeds to block 442. If $PMT(s_x, p_y)$ is not active, the method proceeds to block 444.

At block 442, a program presentation failure is declared for program $s_x$.

At block 444, a determination is made as to whether there is a PMT in use with PID $p_y$. If there is a PMT is use with PID $p_y$, the method follows on-page connector B to block 412. If there is no PMT in use with PID $p_y$, the method proceeds to block 446.

At block 446, the filtering of PID $p_y$ is stopped.

At block 448, $s_x$ is set to a program different from $s_x$, whose PMT is currently not being acquired. The $PMT(s_x, p_y)$ is marked as inactive.

Thus, the method 400 operates to perform program acquisition for use in aspects of a program acquisition system. It should be noted that the method 400 represents just one implementation and that other implementations are possible within the scope of the aspects.

Figure 5:
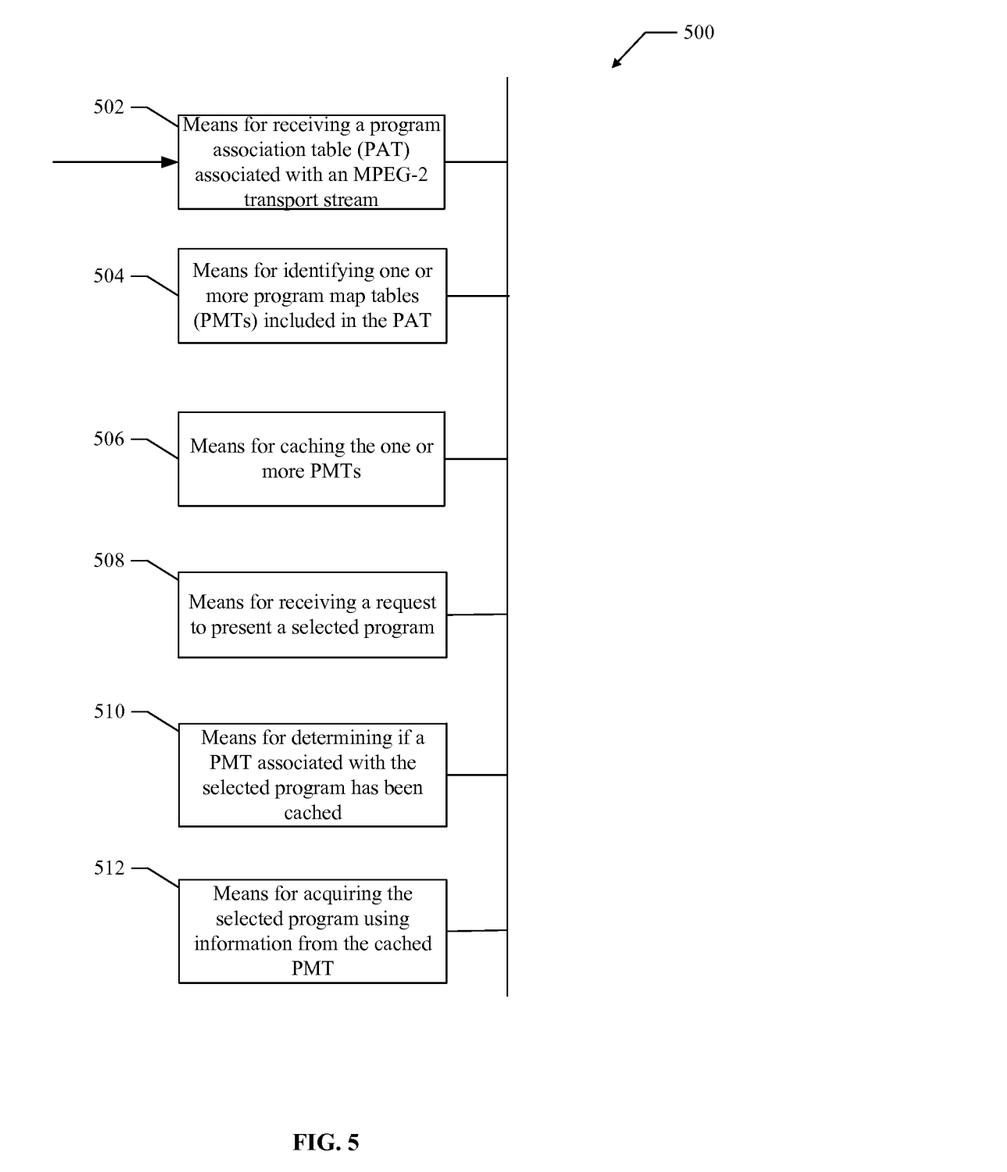
FIG. 5 shows program acquisition logic for use in aspects of a program acquisition system.

FIG. 5 shows program acquisition logic 500 for use in aspects of a program acquisition system. For example, the program acquisition logic 500 is suitable for use as the program acquisition logic 118 shown in FIG. 1. In an aspect, the program acquisition logic 500 is implemented by at least one integrated circuit comprising one or more modules configured to provide aspects of a program acquisition system as described herein. For example, in an aspect, each module comprises hardware and/or hardware executing software.

The program acquisition logic 500 comprises a first module comprising means (502) for receiving a program association table (PAT) associated with an MPEG-2 transport stream, which in an aspect comprises the input logic 306. The program acquisition logic 500 also comprises a second module comprising means (504) for identifying one or more program map tables (PMTs) included in the PAT, which in an aspect comprises the program management logic 302. The program acquisition logic 500 also comprises a third module comprising means (506) for caching the one or more PMTs, which in an aspect comprises the program management logic 302. The program acquisition logic 500 also comprises a fourth module comprising means (508) for receiving a request to present a selected program, which in an aspect comprises the program management logic 302. The program acquisition logic 500 also comprises a fifth module comprising means (510) for determining if a PMT associated with the selected program has been cached, which in an aspect comprises the program management logic 302. The program acquisition logic 500 also comprises a sixth module comprising means (512) for acquiring the selected program using information from the cached PMT, if the PMT associated with the selected program has been cached, which in an aspect comprises the program management logic 302.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a program acquisition system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for program acquisition, the method comprising:
    receiving a program association table (PAT) associated with an MPEG-2 transport stream;
    identifying one or more program map tables (PMTs) included in the PAT;
    caching the one or more PMTs;
    receiving a request to present a selected program;
    determining if a PMT associated with the selected program has been cached;
    if the PMT associated with the selected program has been cached, then acquiring the selected program using information from the cached PMT;
    determining a number of PMT first packet identifiers (PIDs) being filtered; and
    determining if the number of PMT PIDs being filtered is less than a number of unique PIDs.

2. The method of claim 1, wherein said identifying comprises identifying the one or more PMTs based on a heuristic model.

3. The method of claim 1, further comprising:
    receiving a request to stop a selected program presentation; and
    marking a selected PMT associated with the selected program presentation as inactive.

4. The method of claim 1, wherein said caching the one or more PMTs is selectively based on one or more of device capacity, viewing history, priority, and order of reception.

5. The method of claim 4, wherein the act of caching the one or more PMTs selectively based on one or more of device capacity, viewing history, priority, and order of reception includes:
    caching the one or more PMTs selectively based on device capacity.

6. The method of claim 4, wherein the act of caching the one or more PMTs selectively based on one or more of device capacity, viewing history, priority, and order of reception includes:
    caching the one or more PMTs selectively based on viewing history.

7. The method of claim 4, wherein the act of caching the one or more PMTs selectively based on one or more of device capacity, viewing history, priority, and order of reception includes:
    caching the one or more PMTs selectively based on priority.

8. The method of claim 4, wherein the act of caching the one or more PMTs selectively based on one or more of device capacity, viewing history, priority, and order of reception includes:
    caching the one or more PMTs selectively based on order of reception.

9. The method of claim 4, wherein the act of caching the one or more PMTs selectively based on one or more of device capacity, viewing history, priority, and order of reception includes:
    caching the one or more PMTs selectively based on device capacity, viewing history, priority, and order of reception.

10. An apparatus for program acquisition, the apparatus comprising:
    input logic configured to receive a program association table (PAT) associated with an MPEG-2 transport stream; and program management logic configured to:
  identify one or more program map tables (PMTs) included in the PAT;
  cache the one or more PMTs
  receive a request to present a selected program;
  determine if a PMT associated with the selected program has been cached;
  acquire the selected program using information from the cached PMT, if the PMT associated with the selected program has been cached;
  determine a number of PMT first packet identifiers (PIDs) being filtered; and
  determine if the number of PMT PIDs being filtered is less than a number of unique PIDs.

11. The apparatus of claim 10, wherein said program management logic is configured to identify the one or more PMTs based on a heuristic model.

12. The apparatus of claim 11, wherein said program management logic is configured to:
  receive a request to stop a selected program presentation; and
  mark a selected PMT associated with the selected program presentation as inactive.

13. The method of claim 1, further comprising:
  determining if the one or more cached PMTs is in an active state or in an inactive state; and
  removing the one or more cached PMTs in the inactive state.

14. The apparatus of claim 13, wherein the one or more PMTs in the active state corresponds to a program currently being presented.

15. The apparatus of claim 13, wherein the one or more PMTs in the inactive state does not correspond to any program currently being presented.

16. The method of claim 13, wherein the one or more removed PMTs comprise a first PMT corresponding to a first program and a first PID, and wherein the method further comprises:
  determining if the one or more cached PMTs comprise a PMT corresponding to the first PID;
  acquiring a second PMT corresponding to a second program and the first PID if it is determined that the one or more cached PMTs comprise the PMT corresponding to the first PID; and
  acquiring a third PMT corresponding to the second program and a second PID if it is determined that the one or more cached PMTs do not comprise the PMT corresponding to the first PID.

17. The apparatus of claim 10, wherein said program management logic is configured to cache the one or more PMTs selectively based on one or more of device capacity, viewing history, priority, and order of reception.

18. The apparatus of claim 10, wherein said program management logic is configured to:
  determine if the one or more cached PMTs is in an active state or in an inactive state; and
  remove the one or more cached PMTs in the inactive state.

19. The method of claim 18, wherein the one or more PMTs in the active state corresponds to a program currently being presented.

20. The method of claim 18, wherein the one or more PMTs in the inactive state does not correspond to any program currently being presented.

21. The apparatus of claim 18, wherein the one or more removed PMTs comprise a first PMT corresponding to a first program and a first PID, and wherein said program management logic is configured to:
  determine if the one or more cached PMTs comprise a PMT corresponding to the first PID;
  acquire a second PMT corresponding to a second program and the first PID if it is determined that the one or more cached PMTs comprise the PMT corresponding to the first PID; and
  acquire a third PMT corresponding to the second program and a second PID if it is determined that the one or more cached PMTs do not comprise the PMT corresponding to the first PID.

22. An apparatus for program acquisition, the apparatus comprising:
  means for receiving a program association table (PAT) associated with an MPEG-2 transport stream;
  means for identifying one or more program map tables (PMTs) included in the PAT;
  means for caching the one or more PMTs;
  means for receiving a request to present a selected program;
  means for determining if a PMT associated with the selected program has been cached;
  means for acquiring the selected program using information from the cached PMT if the PMT associated with the selected program has been cached;
  means for determining a number of PMT first packet identifiers (PIDs) being filtered; and
  means for determining if the number of PMT PIDs being filtered is less than a number of unique PIDs.

23. The apparatus of claim 22, wherein said means for identifying comprises means for identifying the one or more PMTs based on a heuristic model.

24. The apparatus of claim 23, further comprising:
  means for receiving a request to stop a selected program presentation; and
  means for marking a selected PMT associated with the selected program presentation as inactive.

25. The apparatus of claim 22, wherein said caching the one or more PMTs is selectively based on one or more of device capacity, viewing history, priority, and order of reception.

26. The apparatus of claim 22, further comprising:
  means for determining if the one or more cached PMTs is in an active state or in an inactive state; and
  means for removing the one or more cached PMTs in the inactive state.

27. The computer program product of claim 26, wherein the one or more PMTs in the active state corresponds to a program currently being presented.

28. The computer program product of claim 26, wherein the one or more PMTs in the inactive state does not correspond to any program currently being presented.

29. The apparatus of claim 26, wherein the one or more removed PMTs comprise a first PMT corresponding to a first program and a first PID, and wherein the apparatus further comprises:
  means for determining if the one or more cached PMTs comprise a PMT corresponding to the first PID;
  means for acquiring a second PMT corresponding to a second program and the first PID if it is determined that the one or more cached PMTs comprise the PMT corresponding to the first PID; and
  means for acquiring a third PMT corresponding to the second program and a second PID if it is determined that the one or more cached PMTs do not comprise the PMT corresponding to the first PID.

30. A computer program product for program acquisition, the computer program product comprising:

a machine-readable non-transitory storage medium comprising:
- a first set of codes for causing a computer to receive a program association table (PAT) associated with an MPEG-2 transport stream;
- a second set of codes for causing the computer to identify one or more program map tables (PMTs) included in the PAT;
- a third set of codes for causing the computer to cache the one or more PMTs;
- a fourth set of codes for causing the computer to receive a request to present a selected program;
- a fifth set of codes for causing the computer to determine if a PMT associated with the selected program has been cached;
- a sixth set of codes for causing the computer to acquire the selected program using information from the cached PMT if the PMT associated with the selected program has been cached;
- a seventh set of codes for causing the computer to determine a number of PMT first packet identifiers (PIDs) being filtered; and
- an eighth set of codes for causing the computer to determine if the number of PMT PIDs being filtered is less than a number of unique PIDs.

31. The computer program product of claim 30, wherein said second set of codes is configured to cause the computer to identify the one or more PMTs based on a heuristic model.

32. The computer program product of claim 30, wherein the machine-readable non-transitory storage medium further comprises:
- a ninth set of codes for causing the computer to receive a request to stop a selected program presentation; and
- a tenth set of codes for causing the computer to mark a selected PMT associated with the selected program presentation as inactive.

33. The computer program product of claim 30, wherein said third set of codes is configured to cache the one or more PMTs selectively based on one or more of device capacity, viewing history, priority, and order of reception.

34. The computer program product of claim 30, wherein a ninth set of codes is configured to:
- determine if the one or more cached PMTs is in an active state or in an inactive state; and
- remove the one or more cached PMTs in the inactive state.

35. The computer program product of claim 34, wherein the one or more PMTs in the active state corresponds to a program currently being presented.

36. The computer program product of claim 34, wherein the one or more PMTs in the inactive state does not correspond to any program currently being presented.

37. The computer program product of claim 34, wherein the one or more removed PMTs comprise a first PMT corresponding to a first program and a first PID, and wherein the machine-readable storage medium further comprises:
- a tenth set of codes for causing the computer to determine if the one or more cached PMTs comprise a PMT corresponding to the first PID;
- an eleventh set of codes for causing the computer to acquire a second PMT corresponding to a second program and the first PID if it is determined that the one or more cached PMTs comprise the PMT corresponding to the first PID; and
- a twelfth set of codes for causing the computer to acquire a third PMT corresponding to the second program and a second PID if it is determined that the one or more cached PMTs do not comprise the PMT corresponding to the first PID.

38. At least one integrated circuit configured for program acquisition, the at least one integrated circuit comprising:
- a first module configured to receive a program association table (PAT) associated with an MPEG-2 transport stream;
- a second module configured to identify one or more program map tables (PMTs) included in the PAT;
- a third module configured to cache the one or more PMTs;
- a fourth module configured to receive a request to present a selected program;
- a fifth module configured to determine if a PMT associated with the selected program has been cached;
- a sixth module configured to acquire the selected program using information from the cached PMT if the PMT associated with the selected program has been cached;
- a seventh module configured to determine a number of PMT first packet identifiers (PIDs) being filtered; and
- an eighth module configured to determine if the number of PMT PIDs being filtered is less than a number of unique PIDs.

39. The at least one integrated circuit of claim 38, wherein said second module is configured to identify the one or more PMTs based on a heuristic model.

40. The at least one integrated circuit of claim 38, further comprising:
- a ninth module configured to receive a request to stop a selected program presentation; and
- a tenth module configured to mark a selected PMT associated with the selected program presentation as inactive.

41. The at least one integrated circuit of claim 38, wherein said third module is configured to cache the one or more PMTs selectively based on one or more of device capacity, viewing history, priority, and order of reception.

42. The at least one integrated circuit of claim 38, wherein a ninth module is configured to:
- determine if the one or more cached PMTs is in an active state or in an inactive state; and
- remove the one or more cached PMTs in the inactive state.

43. The computer program product of claim 42, wherein the one or more PMTs in the active state corresponds to a program currently being presented.

44. The computer program product of claim 42, wherein the one or more PMTs in the inactive state does not correspond to any program currently being presented.

45. The at least one integrated circuit of claim 42, wherein the one or more removed PMTs comprise a first PMT corresponding to a first program and a first PID, and wherein the at least one integrated circuit further comprises:
- a tenth module configured to determine if the one or more cached PMTs comprise a PMT corresponding to the first PID;
- an eleventh module configured to acquire a second PMT corresponding to a second program and the first PID if it is determined that the one or more cached PMTs comprise the PMT corresponding to the first PID; and
- a twelfth module configured to acquire a third PMT corresponding to the second program and a second PID if it is determined that the one or more cached PMTs do not comprise the PMT corresponding to the first PID.

* * * * *